(12) United States Patent
Anderson et al.

(10) Patent No.: US 11,052,470 B2
(45) Date of Patent: Jul. 6, 2021

(54) DRILLING ACCESSORY

(71) Applicant: Drilby CC, Cape Town (ZA)

(72) Inventors: Mark William Anderson, Kommetjie (ZA); Andrew Colyn De Jongh, Cape Town (ZA); Michael Robb Anderson, Cape Town (ZA)

(73) Assignee: DRILBY CC, Cape Town (ZA)

( * ) Notice: Subject to any disclaimer, the term of this patent is extended or adjusted under 35 U.S.C. 154(b) by 277 days.

(21) Appl. No.: 16/307,798

(22) PCT Filed: Mar. 29, 2017

(86) PCT No.: PCT/ZA2017/050017
§ 371 (c)(1),
(2) Date: Dec. 6, 2018

(87) PCT Pub. No.: WO2018/027246
PCT Pub. Date: Feb. 8, 2018

(65) Prior Publication Data
US 2020/0306840 A1 Oct. 1, 2020

(30) Foreign Application Priority Data
Aug. 4, 2016 (ZA) .................... 2016/05414

(51) Int. Cl.
B23B 49/02 (2006.01)
B23B 47/28 (2006.01)
(Continued)

(52) U.S. Cl.
CPC .............. *B23B 49/02* (2013.01); *B23B 47/28* (2013.01); *B23B 45/003* (2013.01);
(Continued)

(58) Field of Classification Search
CPC ....... B23B 47/28; B23B 49/02; B23B 49/023; B23B 49/026; B23B 49/04;
(Continued)

(56) References Cited

U.S. PATENT DOCUMENTS 3,583,821 A * 6/1971 Shaub ................ B23Q 11/0053
408/72 R
3,775,020 A 11/1973 Stoutenberg
(Continued)

FOREIGN PATENT DOCUMENTS

EP 1447163 8/2004

OTHER PUBLICATIONS

Search report and written opinion dated Jun. 6, 2018 in International Patent Application Serial No. PCT/ZA2017/050017.

*Primary Examiner* — Alan Snyder
*Assistant Examiner* — Yasir A Diab
(74) *Attorney, Agent, or Firm* — Haugen Law Firm PLLP

(57) ABSTRACT

THIS invention relates to a drilling accessory for a power drill drilling accessory that assists the operator of the power drill to correctly align and orientate the drill bit of the power drill with the target object, and collects the dust and/or debris arising from such drilling. The drilling accessory includes a cap having a plurality of differently sized guide holes and a container to which the cap is pivotally connected. The container comprises a first through hole, which on rotation of the cap relative to the container, enables the first through hole to be aligned with the require guide hole thereby to allow a drill bit to pass therethrough. The container further comprises a base having a planar support surface portion and a seal portion protruding outwardly from the support surface portion towards a contact lip, which contact lip defines a second through hole coaxially aligned with the first through hole. The protruding seal portion defines a bore therein
(Continued)

tapering radially inwardly from the planar surface portion of the base towards the contact lip, which in use biases the contact lip into sealing engagement with the target object to efficiently collect dust and debris, with substantially the entire planar support surface portion contacting the target object thereby to provide a stability for drilling straight holes.

12 Claims, 5 Drawing Sheets

(51) Int. Cl.
  *B23Q 11/08* (2006.01)
  *B23Q 11/00* (2006.01)
  *B23B 45/00* (2006.01)

(52) U.S. Cl.
  CPC ....... *B23B 2247/12* (2013.01); *B23Q 11/0053* (2013.01); *B23Q 11/08* (2013.01)

(58) Field of Classification Search
  CPC ............ B23B 2247/00; B23B 2247/12; B23B 2260/104; B23B 2260/126; B23B 2270/12; B23B 45/003; B23Q 11/0042; B23Q 11/0046; B23Q 11/005; B23Q 11/0053; B23Q 11/02; B23Q 11/06; B23Q 11/08
  See application file for complete search history.

(56) References Cited

U.S. PATENT DOCUMENTS

| | | | | |
|---|---|---|---|---|
| 4,251,171 | A * | 2/1981 | Brett | B23Q 11/0053 |
| | | | | 125/20 |
| 4,323,100 | A * | 4/1982 | Silken | B23Q 17/22 |
| | | | | 144/154.5 |
| 4,461,603 | A * | 7/1984 | Klee | B23B 47/28 |
| | | | | 408/115 R |
| 5,415,502 | A * | 5/1995 | Dahlin | B23B 47/28 |
| | | | | 408/115 B |
| 5,653,561 | A * | 8/1997 | May | B23Q 11/0046 |
| | | | | 408/67 |
| 6,887,146 | B2 | 5/2005 | Staas et al. | |
| 7,455,486 | B2 * | 11/2008 | Britz | A47L 9/102 |
| | | | | 175/213 |
| 7,878,740 | B2 | 2/2011 | Ono et al. | |
| 7,901,164 | B2 * | 3/2011 | Skradski | B23Q 11/0046 |
| | | | | 408/67 |
| 9,073,161 | B2 | 7/2015 | Tseng | |
| 9,399,272 | B2 | 7/2016 | Magen et al. | |
| D814,901 | S * | 4/2018 | Anderson | D8/70 |
| 2007/0264092 | A1 * | 11/2007 | Kesten | B23Q 11/0046 |
| | | | | 408/67 |
| 2009/0311058 | A1 | 12/2009 | Canas Fontan | |

* cited by examiner

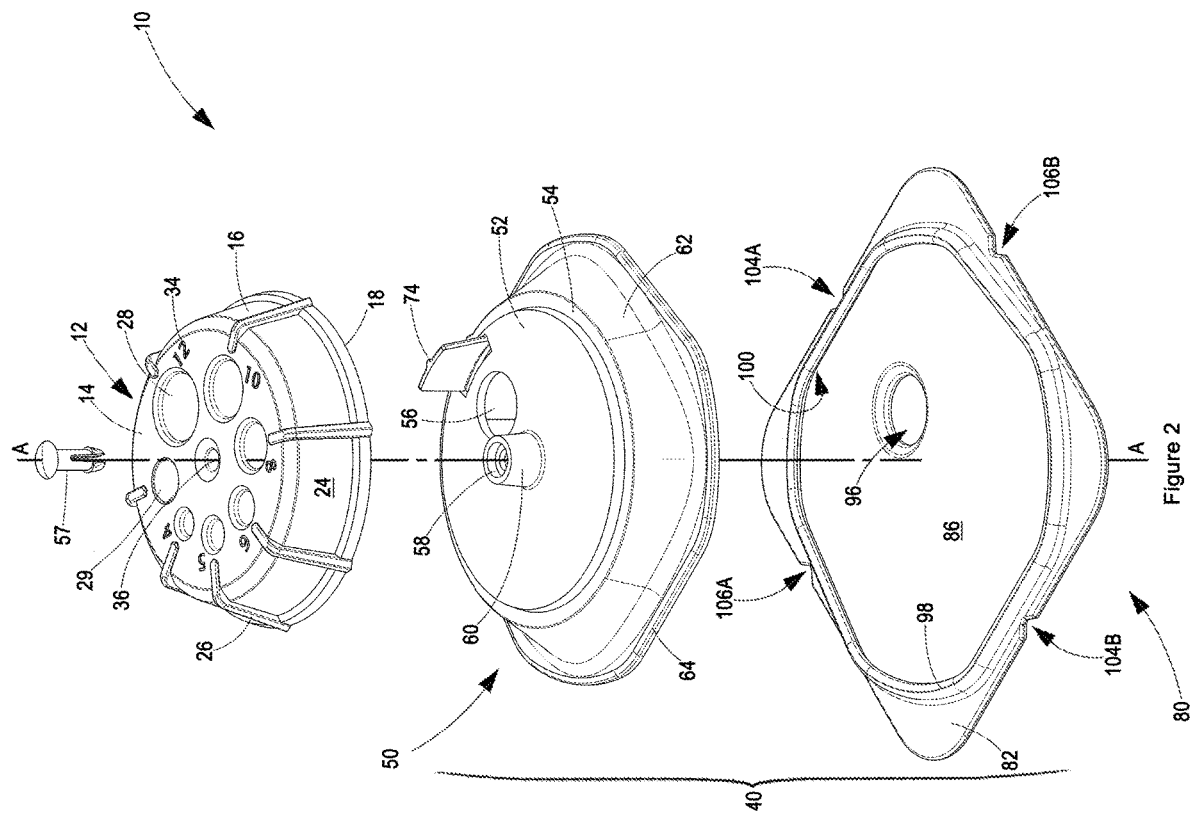
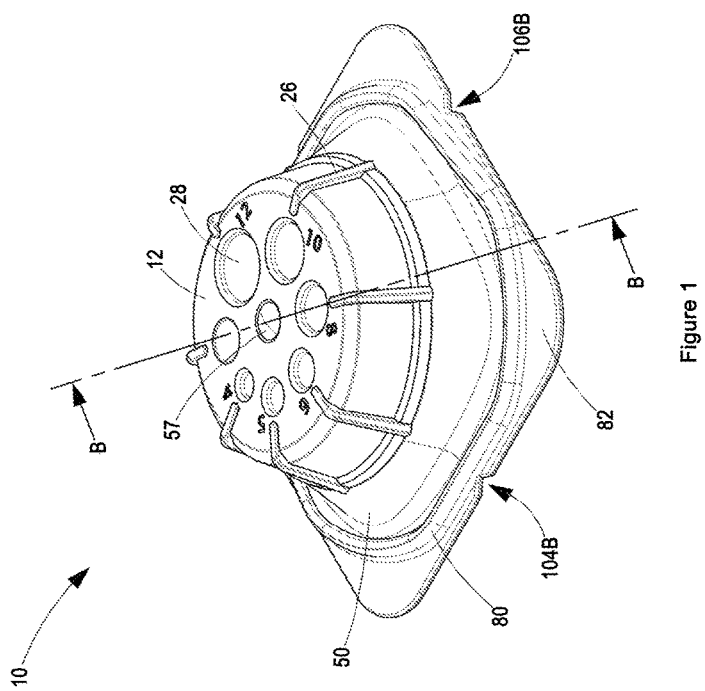
Figure 2
Figure 1

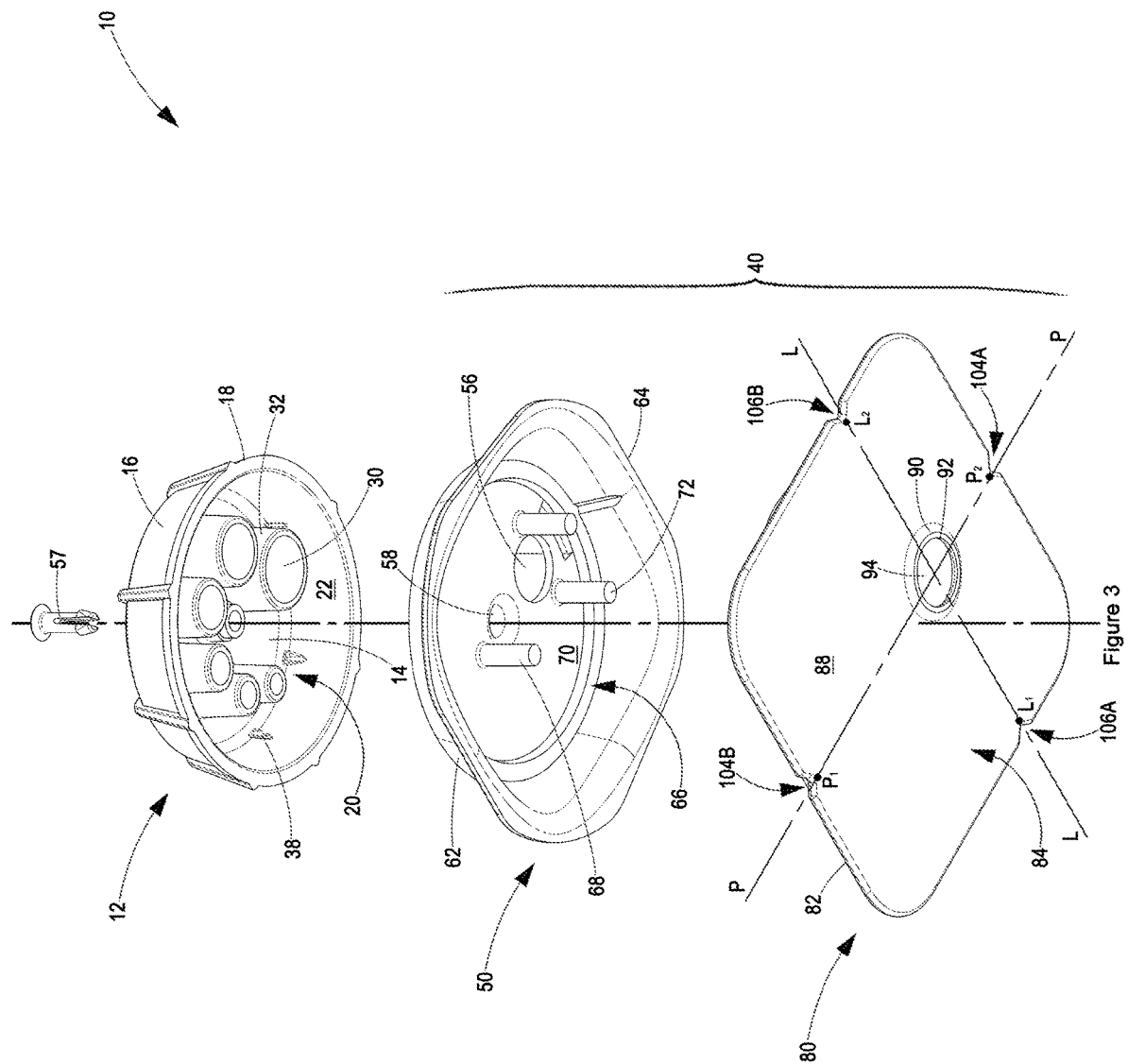

DRILLING ACCESSORY

BACKGROUND OF THE INVENTION

THIS invention is a drilling accessory, more specifically, a power drill drilling accessory that:
- assists the operator of the power drill to correctly align and orientate the drill bit of the power drill with the target object being drilled (e.g. a wall) (hereinafter referred to as "the Target Object") so as to thereby ensure drilling accuracy; and
- collects the dust and/or debris arising from such drilling and thereby greatly reduces dust and mess so as to: (i) prevent any dirtying or marking or staining of walls, floors and/or carpets occasioned by such dust and/or debris; and (ii) eliminate the need to clean up such dust and/or debris after drilling.

There are various existing kinds of drill dust collectors. One type of such collector is marketed under the name "Silverline Drill Dust Collector" (hereinafter referred to as "the Silverline Collector"), which collector is in the form of a container defining a cavity for collecting and holding drilling dust and/or debris, and a through hole on each of a pair of opposing faces of such container.

Although the Silverline-type collectors do to some extent assist the user in orientating the drill bit passing through such through holes correctly with the Target Object, they are typically manufactured with larger single-sized-through holes through which a number of drill bits of differing sizes can pass, with the result that drill bits of smaller sizes are not accurately guided, having the consequence of skew holes being drilled. Other disadvantages of the Silverline-type collectors are:
- their Target Object contacting face is generally made from a plastic-like material incapable of gripping and sealing effectively against the surface of the Target Object, particularly stippled plastered walls, resulting in some of the dust falling out between the Target Object and the collector before it can reach the dust collecting cavity; and
- the Target Object contacting face area is often very small and consequently unstable, resulting in skew drilling of holes and posing an injury hazard.

ZAHLMANN in German patent no. DE2803888 teaches of a collector (hereinafter referred to as "the ZAHLMANN Collector"), which like the Silverline Collector includes a container defining a dust collecting cavity and a through hole on each of a pair of opposing first and second faces of such container.

The ZAHLMANN Collector further incorporates, rotatably mounted on the first face of the container, a dial defining a plurality of differently sized holes for accommodating differently sized drill bits and, standing proud from the second face of the container, a sealing member.

Although the ZAHLMANN Collector appears to address the disadvantages of the Silverline Collector with the latter additional features, it too has its own disadvantages.

The first of such disadvantages is that the collector appears to have to be physically attached to the power drill itself by way of a spring-loaded connecting rod, and cannot seemingly be utilised separately as purely a hand-held device.

The second disadvantage, flowing from the first disadvantage, is a stability problem arising as a result of the sealing member standing proud of the second face of the container and being the only portion of the collector in direct contact with the Target Object. Without fixing the collector to the power drill, as appears to be required in this patent, the collector would be free to angularly displace relative to the wall about the sealing member thereby breaking the seal between the collector and the wall and misaligning the collector relative thereto.

The third disadvantage of the ZAHLMANN Collector is the radially outwardly tapering bore defined by the sealing member as it extends from the through hole in the container towards a contact lip at a free end of the seal member, which in use contacts the Target Object being drilled. In use, the sealing member is squeezed and pinched between the Target Object surface and a raised rim portion of the container defining the through hole, which may cause damage to such sealing member, as well as to the Target Object surface. Furthermore, and in use in respect of a vertical Target Object surface, the tapering bore defines a downwardly sloping surface along which dust under the force of gravity would be forced to move out of the collector and thereby cause unnecessary mess.

It is an object of the present invention to provide a drilling accessory in the form of a hand-held drill bit guide and dust and/or debris collector that not only addresses the shortcomings of the known prior art, but also improves upon it.

SUMMARY OF THE INVENTION

According to the invention there is provided a drilling accessory including:
- a cap defining a plurality of differently sized guide holes operatively for receiving and guiding a correspondingly sized drill bit therethrough so as, in use, to orientate the drill bit substantially orthogonally with a Target Object into which a hole is to be drilled, such guide holes being angularly spaced relative to one another about a central axis extending axially through the cap;
- a container defining a cavity operatively for collecting dust and/or debris arising from drilling, such container having:
  - a cap-engaging end defining a first through hole sized operatively for receiving the drill bit therethrough, the cap being pivotally connected to the cap-engaging end of the container and rotatable relative thereto about the central axis thereby to rotatably position a respective guide hole in the cap in coaxial alignment with the first through hole of the cap-engaging end of the container; and
  - a base having: (i) a substantially planar support surface portion; and (ii) a seal portion protruding outwardly from the planar support surface portion of the base towards a contact lip, the contact lip defining a second through hole coaxially aligned with the first through hole and sized operatively for receiving the drill bit therethrough,
- characterised in that the protruding seal portion defines a bore therein tapering radially inwardly from the planar surface portion of the base towards the contact lip.

The cap may be pivotally connected to the cap-engaging end by a pivot post about which the cap is rotatable relative to the container, the pivot post extending axially from or through the cap or the cap-engaging end of the container to engage a pivot post engaging formation in the other of the cap or the cap-engaging end of the container.

Generally, the pivot post passes through a pivot hole defined axially in the centre of the cap or cap-engaging end of the container and engages threadably or through snap-fit to the pivot post engaging formation in the other of the cap or cap-engaging end of the container.

Typically, the cap is substantially cup-shaped comprising an end wall and sidewalls extending from the end wall such that edges of the sidewalls distal the end wall define an opening into an inner side of the cap sized for at least partially receiving the cap-engaging end of the container therein, and an outer side of the cap defines gripping formations to allow a user to grip the cap during the rotation thereof relative to the container.

Preferably, the guide holes are defined in the end wall of the cap and extend into guide bores defined in corresponding guide tubes extending axially from the inner side of the end wall of the cap, and further wherein numeric indicia corresponding to the size of the guide holes is located on an outer side of the cap, near the respective guide hole to which the numeric indicia is associated.

The drilling accessory may further include corresponding locating formations co-operative between the cap and the container for locating the respective guide holes in co-axial alignment with the first and second through holes.

Generally, the locating formations consist of a locating post extending from the cap or the container, and a plurality of locating formations extending from or defined in the other of the cap or the container being correspondingly engageable with the locating post as the cap is rotated operatively relative to the container.

Typically, the locating formations are angularly spaced relative to one another about the central axis such that engagement of the locating post with one of the respective locating formations locates the associated guide hole in co-axial alignment with the first and second through holes.

The locating post may extend axially and/or radially outwardly from the cap-engaging end of the container, with the locating formations protruding axially outwardly and/or radially inwardly from the inner side of the cap.

In a particularly preferred embodiment of the invention, the container is made up of a cover member and a base member, which members are connectible to one another to form the container and co-operatively define the dust and/or debris collecting cavity therebetween.

Generally, the cover member of the container is substantially cup-shaped with the cap-engaging end of the container being an end wall of the cover member, the cover member further comprising sidewalls extending from the end wall thereof such that connecting edges of the sidewalls distal the end wall thereof define an opening operatively through which collected dust and/or debris can be emptied from the dust and/or debris collecting cavity.

Typically, the base member comprises a first side and a second side, the first side forming the base of the container, which in use is applied to the Target Object, and the second side being connectible to the cover member such that in an assembled condition, the cover member is intermediate the cap and the base member.

Preferably, the second side of the base member comprises a connecting lip extending thereabout, and raised axially therefrom to define: (i) between an end of the connecting lip distal the base; and (ii) a surface of the second side of the base; a recess sized and shaped for receiving the connecting edges of the cover member thereby to connect the members to one another.

The base is generally resiliently deformable thereby to enable movement of the contact lip between a neutral condition and a depressed condition. In the neutral condition, the contact lip lies spaced from the planar support surface portion.

In the depressed condition (i.e. in contact with the surface of the Target Object), the contact lip, together with points on each opposing peripheral edge of the planar support surface portion, lying on an axis extending diametrically across the second through hole, are each: (i) in contact with the Target Object; and (ii) co-planar relative to one another; thereby to prevent angular displacement of the drilling accessory relative to the Target Object in such depressed condition. It will be appreciated that this provides the drilling accessory with stability against the Target Object.

Preferably, the side of the base making contact in use with the surface of the Target Object is also rubbery and tacky in nature. This ensures a firm grip between the drilling accessory and the surface of the Target Object, thereby providing stability both for purposes of accurate drilling and to avoid injury.

Furthermore, the contact lip is typically biased towards the neutral condition by the inherent resilience of the base acting operatively to force the contact lip into sealing engagement with the surface of the Target Object.

Typically, a plurality of posts extend axially from an inner side of the end wall of the cover member, distal ends of which abut the base member so as to: (i) support the cover member spaced from such base member; and (ii) transmit a force imparted on the drilling accessory to the base member about the contact lip so as to retain the contact lip flush against the surface of the Target Object.

Preferably, a contact area on the surface of the Target Object, operatively covered by the planar support surface portion of the base, is substantially the same or greater than an area over which the opening of the cover member extends. It will be appreciated that this further enhances the stability of the drilling accessory against the Target Object.

The base may also comprise alignment formations at points on each opposing peripheral edge thereof, lying on a first axis extending diametrically across the second through hole, for visually aligning the drilling accessory operatively with a reference line or spot marked on the surface of the Target Object.

Typically, the alignment formations are a first pair of notches and a second pair of notches, where:
(i) each of the first notches is defined at each of first opposing peripheral edges of the base on the first axis;
(ii) each of the second notches is defined at each of second opposing peripheral edges of the base on a second axis extending diametrically across the second through hole; and
(iii) the first and second axes are orthogonal relative to one another.

BRIEF DESCRIPTION OF THE INVENTION

The invention will now be described in more detail, by way of example only, with reference to the accompanying illustrations, in which:

FIG. 1 is a perspective view of a drilling accessory in accordance with the present invention;

FIG. 2 is a first exploded view of the drilling accessory of FIG. 1;

FIG. 3 is a second exploded view of the drilling accessory of FIG. 1;

DETAILED DESCRIPTION OF THE INVENTION

Figure 4:
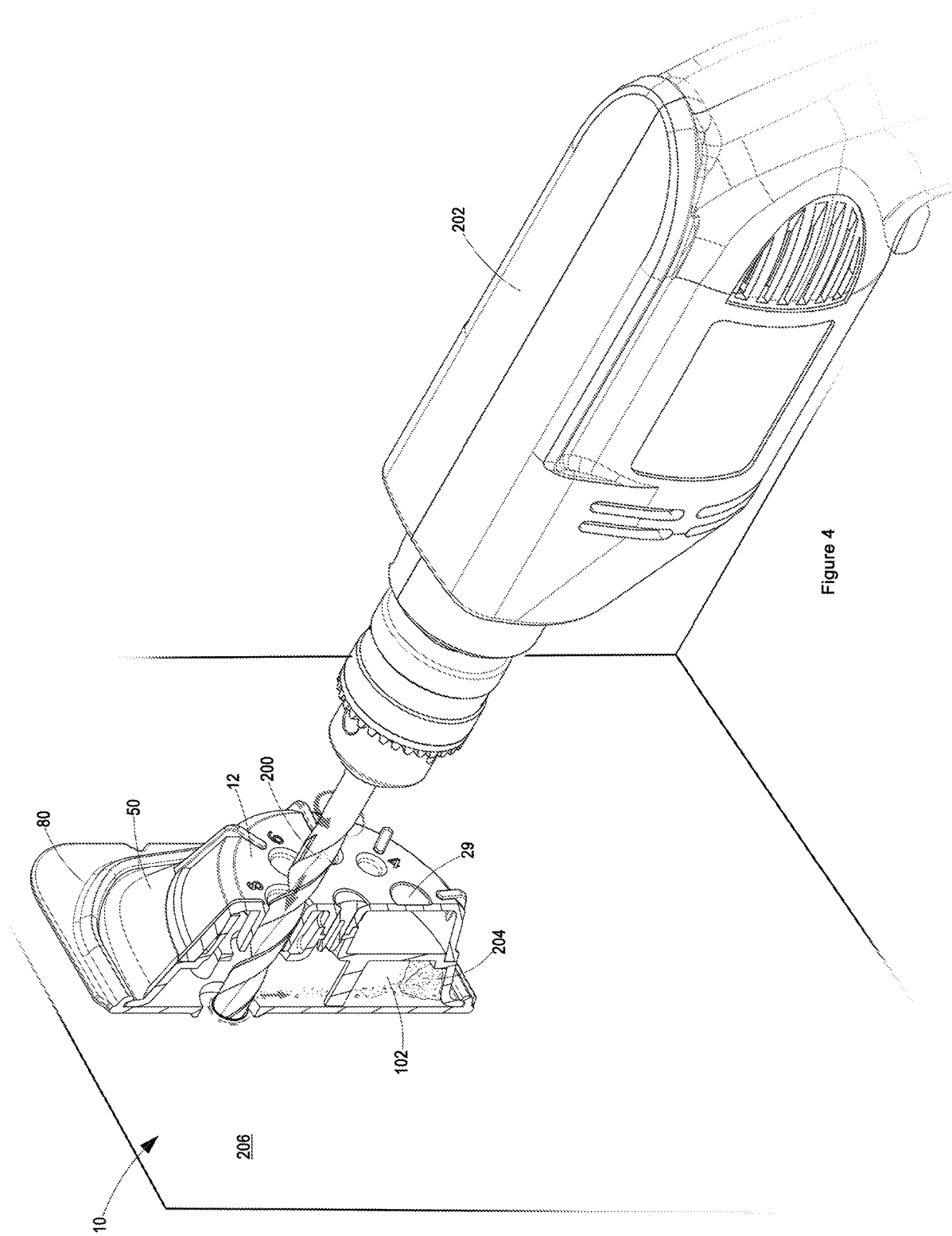
FIG. 4 is a cross-sectional perspective view of the drilling accessory in use while drilling a hole in a Target Object, as viewed on line B-B in FIG. 1.

A drilling accessory according to a preferred embodiment of the invention is designated generally in the accompanying Figures by reference numeral 10. With reference to FIG. 1 and FIG. 2, the drilling accessory incorporates a cap 12 and a container 40, the latter comprising a cover member 50 and a base member 80 being connectible to one another.

With reference also to FIG. 3, the cap 12 is substantially cup-shaped comprising an end wall 14 and sidewalls 16 extending from the end wall 14 such that edges 18 of the sidewalls 16 distal the end wall 14 define an opening 20 into an inner cavity or side 22 of the cap 12.

The inner side 22 of the cap 12 is sized for receiving at least a portion of a cap-engaging end 52 of the container 40, where the cap-engaging end 52 of the container 40 is an end wall 52 of the cup-shaped cover member 50. An outer side 24 of the cap 12 bears gripping formations 26 projecting outwardly from the sidewalls 16 and partially from the end wall 14 thereof, which gripping formations 26 are angularly displaced relative to one another about a central axis A-A extending axially through the centre of the cap 12 as illustrated in FIG. 2.

The end wall 14 of the cap 12 defines a plurality of differently sized guide holes 28, spaced angularly relative to one another about the central axis A-A, and extending into guide bores 30 defined in corresponding guide tubes 32 (see FIG. 3) extending axially from the inner side 22 of the end wall 14 of the cap 12.

Numeric indicia 34 corresponding to the size of the guide holes 28, based on the drill bit size corresponding therewith, are located on the end wall 14 of the cap 12 near the respective guide hole 28 to which the numeric indicia 34 is associated.

It will be appreciated that the gripping formations 26 facilitate grip for purposes of rotating the cap 12 around such central axis in order to select the required drill bit through-hole in the cap 12 and align such through-hole with the through-holes in the cap engaging member 56 and the base member 96 respectively.

The cover member 50 defines a recess 54, cut axially back from the cap-engaging end 52, within which the edges 18 of the sidewalls 16 of the cap 12 operatively ride and rotate. A first through hole 56 is defined in the cap-engaging end 52, sized for operatively allowing a drill bit 200 of a power drill 202 to pass therethrough.

The cap 12 is pivotally connected to the cover member 50 by a pivot post 57 extending through a pivot hole 36 and engaging a pivot bore 58 defined in a pivot post engaging formation 60 extending axially outwardly from the cap-engaging end 52 of the cover member 50. In this manner, the cap 12 is rotatable relative to the cover member 50 about the central axis A-A.

The cap 12, between the largest and smallest guide holes 28, comprises a closing section 29 which, when aligned over the through hole 56 in the cover member 50, effectively closes such through hole 56 thereby to contain any dust and/or debris within the drilling accessory 10.

Although the pivot post 57 has been illustrated in the accompanying Figures as a splaying snap-fit type fastener, it will be appreciated that other fasteners may be used. For example, a pivot bolt may be used for threadably engaging a threaded pivot bore 58.

As previously described, the cover member 50 is substantially cup-shaped having sidewalls 62 extending from the cap-engaging end 52 and terminating at connecting edges 64 distal from the cap-engaging end 52 of the cover member 50, which connecting edges 64 define an opening 66, the use of which will be described in greater detail later in this description.

Figure 5:
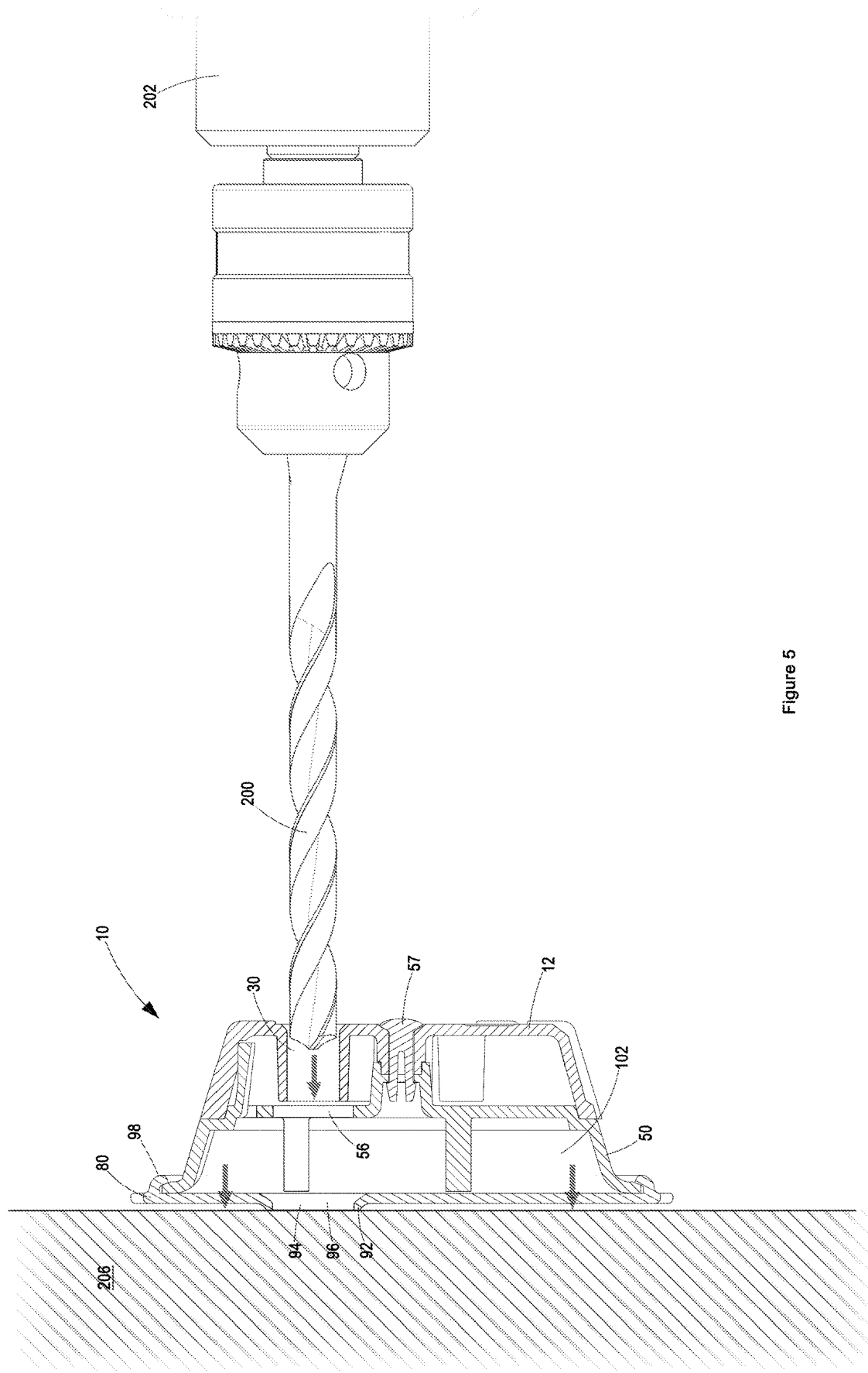
FIG. 5 is a cross-sectional side view of the drilling accessory of FIG. 4 with a drill bit of a power drill entering the guide hole in the cap member.
Figure 6:
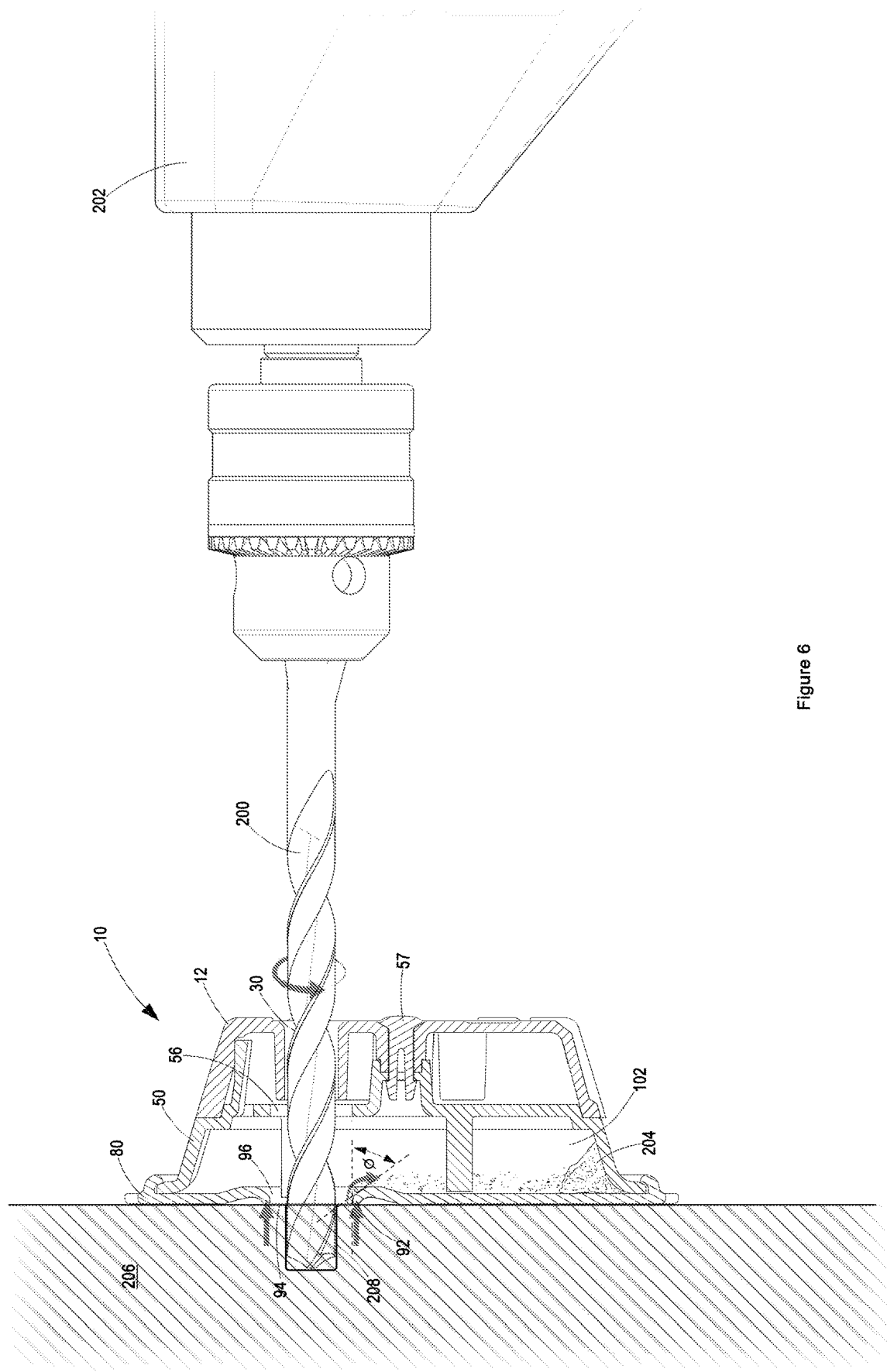
FIG. 6 is a cross-sectional side view of the drilling accessory of FIG. 4 with the drill bit drilling into the Target Object.

A plurality of posts 68 extend axially from an inner side 70 of the cap-engaging end wall 52 of the cover member 50, the distal ends 72 of which abut the base member 80 thereby to support the cap-engaging end 52 spaced from such base member 80, so as to ensure that the base member 80 and the contact lip 92 of the through hole 94 thereon remain flush against the surface of a Target Object 206 being drilled as illustrated in FIGS. 4 to 6.

The drilling accessory 10 further includes locating formations co-operative between the cap 12 and the container 40 for locating the respective guide holes 28 in co-axial alignment with the first and second through holes 56, 94 in the container 40.

The locating formations may take many different forms, but preferably comprise a locating post 74, extending axially outwardly from the cap-engaging end 52 of the cover member 50, being engageable with a plurality of locating formations 38, extending radially and/or axially inwardly from the inner side 22 of the cap 12, as the cap 12 is rotated relative to the container 40.

The locating formations 38 are angularly spaced relative to one another about the central axis A-A such that engagement of the locating post 74 with one of the respective locating formations 38 locates the associated guide hole 28 in co-axial alignment with the first and second through holes 56, 94.

The base member 80 has a base 82, which base 82 is an operative Target Object contacting surface of the base member 80 and has respective first and second opposing surfaces 84, 86. The first surface 84 comprises a substantially planar support surface portion 88 and a seal portion 90. The seal portion 90 protrudes axially outwardly from the first surface 84 of the base 80 towards a contact lip 92, which contact lip 92 defines the second through hole 94 which, with the cover member 50 connected to the base member 80, is coaxially aligned with the first through hole 56 in the cover member 50 and sized for operatively receiving the drill bit 200 therethrough.

The protruding seal portion 90 defines a bore 96 tapering radially inwardly as it extends from the planar surface portion 88 of the base 82, more specifically from the second surface 86 thereof, towards the contact lip 92, the significance of which will be described in greater detail later in this description.

A connecting lip 98 extends about, and is raised axially from the second surface 86 of the base 82, thereby to define: (i) between an end of the connecting lip 98 distal the base 82; and (ii) the second surface 86 of the base 82; a recess 100 sized and shaped for receiving the connecting edges 64 of the cover member 50 thereby to connect the members 50, 80 to one another.

The portion of the connecting lip 98 on the side of the base member 80 closest to the through hole 94 preferably has a dimension unequal to that of the portion of the connecting lip 98 on the side of the base member 80 furthest from the through hole 94. With the corresponding sides of the cover member 50 having dimensions matching the dimensions of the relevant portions of the connecting lip 98, the cover member 50 and the base member 80 can only be connected in a single orientation relative to one another such that their respective through holes 56, 94 are always co-axially aligned.

With reference now also to FIG. 4, the cover member 50 and the base member 80 in a connected condition co-operatively define a cavity 102 for collecting dust and/or debris 204 arising from drilling as illustrated in FIG. 4.

The base member 80, or at least the base 82 thereof, is resiliently deformable and preferably made from an elastomeric material to thereby enable movement of the contact lip 92 between a neutral condition (as illustrated in FIG. 3 and FIG. 5) and a depressed condition (as illustrated in FIG. 4 and FIG. 6), so as to ensure that the base 82 of the base member 80, and specifically the first surface 84 thereof, remains flush to the surface of the Target Object 206 such that no dust and/or debris can escape.

In addition, the material from which the base is manufactured is preferably of a tacky and/or rubbery type so as to thereby ensure secure grip of the first surface 84 of the base member 80 to the surface of the Target Object 206, ensuring stability and consequent accuracy of drilling and avoidance of injury.

In the neutral condition, the contact lip 92 lies spaced from the planar support surface portion 88 of the base 82. In the depressed condition, (in use and with reference to FIG. 3) the contact lip 92, together with points L1, L2; P1, P2 on each opposing peripheral edge of the planar support surface portion 88, lying on one of axes L-L; P-P extending diametrically across the second through hole 94, are each: (i) in contact with the surface of the Target Object (e.g. a wall 206); and (ii) co-planar relative to one another, thereby ensuring that the first surface 84 of the base member 80 stays flush with the surface of the Target Object 206.

It will be appreciated that inherent resilience of the base member 80 biases the contact lip 92 towards the neutral condition, forcing the contact lip 92 into sealing engagement with the surface of the Target Object (typically a wall) 206, and thereby preventing any dust and/or debris from escaping.

It will be appreciated further that with points L1, L2; P1, P2 co-planar with the contact lip 92, angular displacement of the drilling accessory 10 in use and relative to the surface of the Target Object 206 is prevented. As such, the drilling accessory 10 is operatively positionable securely against the Target Object 206 in a stable manner, with little chance of moving out of sealing engagement with the Target Object 206 during drilling, and also thereby ensuring straight drilling of holes into the Target Object 2016 through method of guidance of the drill bit through the guide tubes 32.

The stability of the drilling accessory 10 is further enhanced by having a contact area operatively covered by the planar support surface portion 88 of the base member 80 on the surface of the Target Object 206 being the same or greater than an area over which the opening 66 of the cover member 50 extends.

To enable a user to visually align the drilling accessory 10 with one or more drilling reference lines or marks on the Target Object 206, the base member 80 further has alignment formations, preferably in the form of two pairs of opposing alignment notches 104A, 104B; 106A, 106B lying on respective orthogonal axes P-P, L-L and defined in opposing peripheral edges of the base member 80.

In use, the cap 12 is rotatable by gripping the cap 12 and the gripping formations 26 thereon and turning it relative to the container 40 until the required-size guide hole 28 is located co-axially over the through holes 56, 94 in the container 40. With reference now to FIG. 4, the user may then position the drilling accessory 10 against the surface of the Target Object 206 in such a manner so as to place the contact lip 92 in contact with the wall 206 and to visually align the alignment notches 104A, 104B; 106A, 106B with the drilling reference marks (not shown) centralised in the through hole 94 of the base member 80.

As the drilling accessory 10 is pushed securely against the Target Object 206, as illustrated in FIG. 6, the contact lip 92 moves from the neutral condition into the depressed condition. In the depressed condition, the inherent resilience of the base member 80 acts to force the contact lip 92 towards the neutral condition and consequently into sealing engagement with the surface of the Target Object 206, about the hole to be dilled.

Furthermore, with substantially the entire planar support surface portion 88 bearing against the surface of the Target Object 206, the drilling accessory 10 is stable relative to the Target Object 206 so as to enable the drill bit 200, guided by the guide bore 30 of the relevant guide tube 32, to enter the Target Object 206 perpendicularly during drilling, to thereby ensure straight drilling of holes.

With a secure seal between the drilling accessory 10 and the surface of the Target Object 206, dust and/or debris 204 evacuated from the hole 208 during drilling is collected in the cavity 102 of the container 40. It will be appreciated that although the dust and/or debris 204 is to a large extent evacuated back into the cavity 102 by the drill bit 200, the operatively downwardly sloping face (as depicted in FIG. 6 by angle Ø as a result of the tapering bore 96) also acts to direct dust and/or debris 204 under the force of gravity efficiently into the cavity 102.

On releasing the drilling accessory 10 from the Target Object 206 following drilling, the drilling accessory 10 may be removed in a manner to allow the planar support surface portion 88 to lift away from the Target Object 206 with the contact lip 92 remaining in contact (i.e. as the drill bit is withdrawn from the drilling accessory). This enables dust and/or debris 204 released from the hole 208 to continue falling under the force of gravity operatively downwardly along the sloping face into the cavity 102, until the drilling accessory 10 is lifted clear from the Target Object 206.

With the drilling accessory 10 lifted clear from the Target Object 206, the cover member 50 and the base member 80 are disconnectible from one another so as to thereby empty the cavity 102 by way of discarding the dust/debris via the opening 66 of the cover member 50 into a dustbin.

Although the invention has been described with reference to a preferred embodiment, it will be appreciated that many modifications or variations of the invention are possible without departing from the spirit or scope of the invention.

The invention claimed is:

1. A drilling accessory including:
    a cap defining a plurality of differently sized guide holes operatively for receiving and guiding a correspondingly sized drill bit therethrough so as, in use, to orientate the drill bit substantially orthogonally with a Target Object into which a hole is to be drilled, such guide holes being angularly spaced relative to one another about a central axis extending axially through the cap;
    a container defining a cavity operatively for collecting at least one of dust and debris arising from drilling, such container having:
        a cap-engaging end defining a first through hole sized operatively for receiving the drill bit therethrough, the cap being pivotally connected to the cap-engaging end of the container and rotatable relative thereto about the central axis thereby to rotatably position a respective guide hole in the cap in coaxial alignment with the first through hole of the cap-engaging end of the container; and a base having: (i) a substantially planar support surface portion; and (ii) a seal portion protruding outwardly from the planar support surface portion of the base externally from the dust and debris collecting cavity, towards a contact lip defining a second through hole coaxially aligned with the first through hole and sized operatively for receiving the drill bit therethrough;

characterised in that the protruding seal portion defines a bore therein tapering radially inwardly from the planar support surface portion of the base towards the contact lip;

wherein the cap is pivotally connected to the cap-engaging end by a pivot post about which the cap is rotatable relative to the container, the pivot post extending axially from or through the cap or the cap-engaging end of the container to engage a pivot post engaging formation in the other of the cap or the cap-engaging end of the container;

the pivot post passing through a pivot hole defined axially in the centre of the cap or cap-engaging end of the container and engaging threadably or through snap-fit to the pivot post engaging formation in the other of the cap or cap-engaging end of the container;

wherein the cap is substantially cup-shaped comprising an end wall and sidewalls extending from the end wall such that edges of the sidewalls distal the end wall define an opening into an inner side of the cap sized for at least partially receiving the cap-engaging end of the container therein, and further wherein an outer side of the cap defines gripping formations for a user in use to grip the cap during the rotation thereof relative to the container; and wherein the guide holes are defined in the end wall of the cap and extend into guide bores defined in corresponding guide tubes extending axially from the inner side of the end wall of the cap, and further wherein numeric indicia corresponding to the size of the guide holes is located on an outer side of the cap, near the respective guide hole to which the numeric indicia is associated.

2. A drilling accessory according to claim 1 including corresponding locating formations co-operative between the cap and the container for locating the respective guide holes in co-axial alignment with the first and second through holes.

3. A drilling accessory according to claim 2, wherein the locating formations are locating posts extending from the cap or the container and a plurality of locating formations extending from or defined in the other of the cap or the container being correspondingly engageable with the locating post as the cap is rotated operatively relative to the container, the locating formations being angularly spaced relative to one another about the central axis such that engagement of the locating post with one of the respective locating formations locates the associated guide hole in co-axial alignment with the first and second through holes.

4. A drilling accessory according to claim 3, wherein the locating post extends at least one of axially and radially outwardly from the cap-engaging end of the container, with the locating formations protruding at least one of axially outwardly and radially inwardly from the inner side of the cap.

5. A drilling accessory according to claim 4, wherein the container is made up of a cover member and a base member, which members are connectible to one another to form the container and co-operatively define the dust and debris collecting cavity therebetween.

6. A drilling accessory according to claim 5, wherein the cover member is substantially cup-shaped with the cap-engaging end of the container being an end wall of the cover member, the cover member further comprising sidewalls extending from the end wall thereof such that connecting edges of the sidewalls distal the cap-engaging end wall thereof define an opening operatively through which collected dust and debris can be emptied from the dust and debris collecting cavity.

7. A drilling accessory according to claim 6, wherein the base member comprises a first side and a second side, the first side forming the base of the container and the second side being connectible to the cover member, such that in an assembled condition, the cover member is intermediate the cap and the base member.

8. A drilling accessory according to claim 7, wherein the second side of the base member comprises a connecting lip extending thereabout, and raised axially therefrom to define: (i) between an end of the connecting lip distal the base; and (ii) a surface of the second side of the base; a recess sized and shaped for receiving the connecting edges of the cover member thereby to connect the members to one another.

9. A drilling accessory according to claim 8, wherein the base is resiliently deformable thereby to enable movement of the contact lip between a neutral condition, wherein the contact lip lies spaced from the planar support surface portion, and a depressed condition, wherein the contact lip, together with points on each opposing peripheral edge of the planar support surface portion, lying on a axis extending diametrically across the second through hole, are each: (i) in contact with the Target Object; and (ii) co-planar relative to one another; thereby to prevent angular displacement of the drilling accessory relative to the Target Object in such depressed condition, and further wherein the contact lip is biased towards the neutral condition by the inherent resilience of the base acting operatively to force the contact lip into sealing engagement with a surface of the Target Object.

10. A drilling accessory according to claim 9, wherein a contact area on the surface of the Target Object, operatively covered by the planar support surface portion of the base, is substantially the same or greater than an area over which the opening of the cover member extends.

11. A drilling accessory according to claim 10, wherein the base comprises alignment formations at points on each opposing peripheral edge thereof, lying on a first axis extending diametrically across the second through hole, for visually aligning the drilling accessory operatively with a reference line or spot marked on the surface of the Target Object.

12. A drilling accessory according to claim 11, wherein the alignment formations are a first pair of notches and a second pair of notches, where:
  (i) each of the first notches is defined at each of first opposing peripheral edges of the base on the first axis;
  (ii) each of the second notches is defined at each of second opposing peripheral edges of the base on a second axis extending diametrically across the second through hole; and (iii) the first and second axes are orthogonal relative to one another.

\* \* \* \* \*